(12) United States Patent
Savoj et al.

(10) Patent No.: US 11,023,403 B2
(45) Date of Patent: *Jun. 1, 2021

(54) CHIP TO CHIP INTERFACE WITH SCALABLE BANDWIDTH

(71) Applicant: Apple Inc., Cupertino, CA (US)

(72) Inventors: Jafar Savoj, Sunnyvale, CA (US); Jose A. Tierno, Palo Alto, CA (US); Sanjeev K. Maheshwari, Fremont, CA (US); Brian S. Leibowitz, San Francisco, CA (US); Pradeep R. Trivedi, Saratoga, CA (US); Gin Yee, Mountain View, CA (US); Emerson S. Fang, Fremont, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/700,356

(22) Filed: Dec. 2, 2019

(65) Prior Publication Data
US 2020/0183874 A1 Jun. 11, 2020

Related U.S. Application Data

(63) Continuation of application No. 16/204,252, filed on Nov. 29, 2018, now Pat. No. 10,521,391.

(51) Int. Cl.
*G06F 13/42* (2006.01)
*G06F 9/52* (2006.01)
*G06F 13/40* (2006.01)

(52) U.S. Cl.
CPC .......... *G06F 13/4221* (2013.01); *G06F 9/526* (2013.01); *G06F 13/4004* (2013.01)

(58) Field of Classification Search
CPC .. G06F 13/4221; G06F 9/526; G06F 13/4004; G06F 13/4072

(Continued)

(56) References Cited

U.S. PATENT DOCUMENTS 5,936,963 A 8/1999 Saussy
6,822,940 B1 * 11/2004 Zavalkovsky .......... H04L 47/10
370/235

(Continued)

OTHER PUBLICATIONS

Belli et al., "Notified Access: Extending Remote Memory Access Programming Models for Producer-Consumer Synchronization", 2015 IEEE International Parallel and Distributed Processing Symposium (IPDPS), May 2015, 11 pages, http://unixer.de/publications/img/notified-access-extending-rma.pdf. [Retrieved Mar. 12, 2020].

(Continued)

*Primary Examiner* — Paul R. Myers
(74) *Attorney, Agent, or Firm* — Kowert Hood Munyon Rankin and Goetzel PC; Rory D. Rankin (57) ABSTRACT

A system and method for efficiently transporting data across lanes. A computing system includes an interconnect with lanes for transporting data between a source and a destination. When a source receives an indication of a bandwidth requirement change from a first data rate to a second data rate, the transmitter in the source sends messages to the receiver in the destination. The messages indicate that the data rate is going to change and reconfiguration of one or more lanes will be performed. The transmitter selects one or more lanes for transporting data at the second data rate. The transmitter maintains data transport at the first data rate while reconfiguring the selected one or more lanes to the second data rate. After completing the reconfiguration, the transmitter transports data at the second data rate on the selected one or more lanes while preventing data transport on any unselected lanes.

20 Claims, 6 Drawing Sheets

(58) Field of Classification Search
USPC ........................................................ 710/106
See application file for complete search history.

(56) References Cited

U.S. PATENT DOCUMENTS

| | | | |
|---|---|---|---|
| 7,136,953 | B1 | 11/2006 | Bisson et al. |
| 7,370,132 | B1* | 5/2008 | Huang ................ G06F 13/4018 710/307 |
| 7,461,195 | B1 | 12/2008 | Woodral |
| 8,285,884 | B1 | 10/2012 | Norrie |
| 8,437,343 | B1 | 5/2013 | Wagh et al. |
| 8,599,913 | B1 | 12/2013 | Brown et al. |
| 8,699,514 | B2 | 4/2014 | Huff et al. |
| 8,904,077 | B1 | 12/2014 | Alston |
| 9,071,256 | B1 | 6/2015 | Reiss et al. |
| 9,654,206 | B1 | 5/2017 | Johnson et al. |
| 9,654,342 | B2* | 5/2017 | Jaussi .................. G06F 13/385 |
| 10,521,391 | B1 | 12/2019 | Savoj et al. |
| 2005/0063353 | A1 | 3/2005 | Anderson et al. |
| 2007/0268829 | A1* | 11/2007 | Corwin .................. H04L 47/30 370/235 |
| 2008/0056284 | A1 | 3/2008 | Powell et al. |
| 2011/0173352 | A1 | 7/2011 | Sela et al. |
| 2013/0077701 | A1 | 3/2013 | Tsien et al. |
| 2014/0006670 | A1 | 1/2014 | Wagh |
| 2014/0237142 | A1 | 8/2014 | Jaussi et al. |
| 2015/0288911 | A1* | 10/2015 | Dickens ................. G09G 5/006 348/723 |
| 2016/0134951 | A1 | 5/2016 | Mills |
| 2018/0331864 | A1 | 11/2018 | Das Sharma |

OTHER PUBLICATIONS

Danalis et al., "Gravel: A Communication Library to Fast Path MPI", Proceedings of the 15th European PVM/MPI Users' Group Meeting on Recent Advances in Parallel Virtual Machine and Message Passing Interface, Sep. 2008, pp. 111-119, http://citeseerx.ist.psu.edu/viewdoc/download?doi=10.1.1.145.9324&rep=rep1&type=pdf. [Retrieved Mar. 12, 2020].

Malicevic et al., "Exploiting NVM in large-scale graph analytics", INFLOW '15: Proceedings of the 3rd Workshop on Interactions of NVM/FLASH with Operating Systems and Workloads, Oct. 2015, 9 pages, http://citeseerx.ist.psu.edu/viewdoc/download?doi=10.1.1.899.7101&rep=rep1&type=pdf. [Retrieved Mar. 12, 2020].

Suzuki et al., "The Non-Volatile Memory Technology Database (NVMDB)", Department of Computer Science & Engineering, San Diego Technical Report CS2015-1011, May 2015, 5 pages, http://cseweb.ucsd.edu/~swanson/papers/TR2015-NVMDB.pdf. [Retrieved Mar. 12, 2020].

Vishnu et al., "Building Scalable PGAS Communication Subsystem on Blue Gene/Q", 2013 IEEE 27th International Parallel and Distributed Processing Symposium Workshops & PhD Forum (IPDPSW), May 2013, 9 pages, https://hpc.onl.gov//people/vishnu/public/vishnu_cass13.pdf. [Retrieved Mar. 12, 2020].

Zhang et al., "Mojim: A Reliable and Highly-Available Non-Volatile Memory System", Proceedings of the Twentieth International Conference on Architectural Support for Programming Languages and Operating Systems (ASPLOS '15), Mar. 2015, 16 pages, http://cseweb.ucsd.edu/~yiyingzhang/mojim-asplos15.pdf. [Retrieved Mar. 12, 2020].

PCI Express Base Specification Revision 3.0 Nov. 10, 2010 (Year: 2010).

* cited by examiner

CHIP TO CHIP INTERFACE WITH SCALABLE BANDWIDTH

CROSS REFERENCE TO RELATED APPLICATIONS

This application is a continuation of U.S. patent application Ser. No. 16/204,252, entitled "CHIP TO CHIP INTERFACE WITH SCALABLE BANDWIDTH", filed Nov. 29, 2018, the entirety of which is incorporated herein by reference.

BACKGROUND

Technical Field

Embodiments described herein relate to the field of computing systems and, more particularly, to efficiently transporting data across lanes.

Description of the Related Art

Systems on chips (SoCs) are becoming increasingly complex with ever increasing numbers of agents within a typical SoC and available endpoints. Examples of the agents are multimedia engines, digital signal processors (DSPs), and processing units, each with one or more of a central processing unit (CPU) and a data parallel processor like a graphics processing unit (GPU). Endpoints include input/output (I/O) peripheral devices such as memory devices, communication interfaces such as radio communication interfaces, speakers, displays and so on. Data is shared among the different agents of the SoC and among the available endpoints.

Typically, an interconnect transports transactions from a source, such as an agent, to a destination such as another agent or an endpoint. In some cases, the interconnect is a communication fabric. When transferring transactions between a source and a destination, electrical signals are sent on multiple, parallel metal traces. Transmitters in the source send the electrical signals across the parallel metal traces to be received by receivers in the destination.

In some cases the source and the destination are within a same die, but in other cases they are on separate dies. In either case, the data rate across the metal traces is typically set in a static manner. When the computing system determines a change in the data rate is needed, data transport of payload data used by applications is halted while the source and the destination reconfigure the transmitters and the receivers for the new data rate. Therefore, the available bandwidth becomes zero during the duration of the reconfiguration which reduces performance.

In view of the above, efficient methods and mechanisms for efficiently transporting data across lanes are desired.

SUMMARY

Systems and methods for efficiently transporting data across lanes are contemplated. In various embodiments, a computing system includes a communication fabric (or fabric) for routing traffic among one or more agents and one or more endpoints. Each agent and each endpoint is both a source and a destination for transactions depending on the direction of traffic flow through the fabric. The computing system receives a workload and processes instructions, commands and routines corresponding to the workload. Particular characteristics of the computing system are used to determine whether a reassignment of data transport rates occurs. For example, an indication of new task assignments from the operating system scheduler and an indication of new power-performance states for the components in the computing system are used to determine whether reassignment occurs.

The data transport rate, which is also referred to as the data rate, is the amount of data transported during a given period of time between transmitters in a source and receivers in a destination. The data rate is also referred to as the bandwidth. Data is transported between the transmitters and the receivers over metal traces, which are also referred to as transmission lines or lanes. When a source receives an indication of a bandwidth requirement change from a first data rate to a different second data rate, the transmitter sends messages to the receiver in the destination.

The messages indicate that the data rate is going to change and reconfiguration of one or more lanes will be performed. Control logic in the transmitter selects one or more lanes of multiple lanes for transporting data at the second data rate. The transmitter maintains data transport at the first data rate while reconfiguring the selected one or more lanes to the second data rate. After completing the reconfiguration, the transmitter transports data at the second data rate on the selected one or more lanes while preventing data transport on any unselected lanes. Therefore, the bandwidth is dynamically changed while applications are processed without the available bandwidth dropping to zero.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Figure 1:
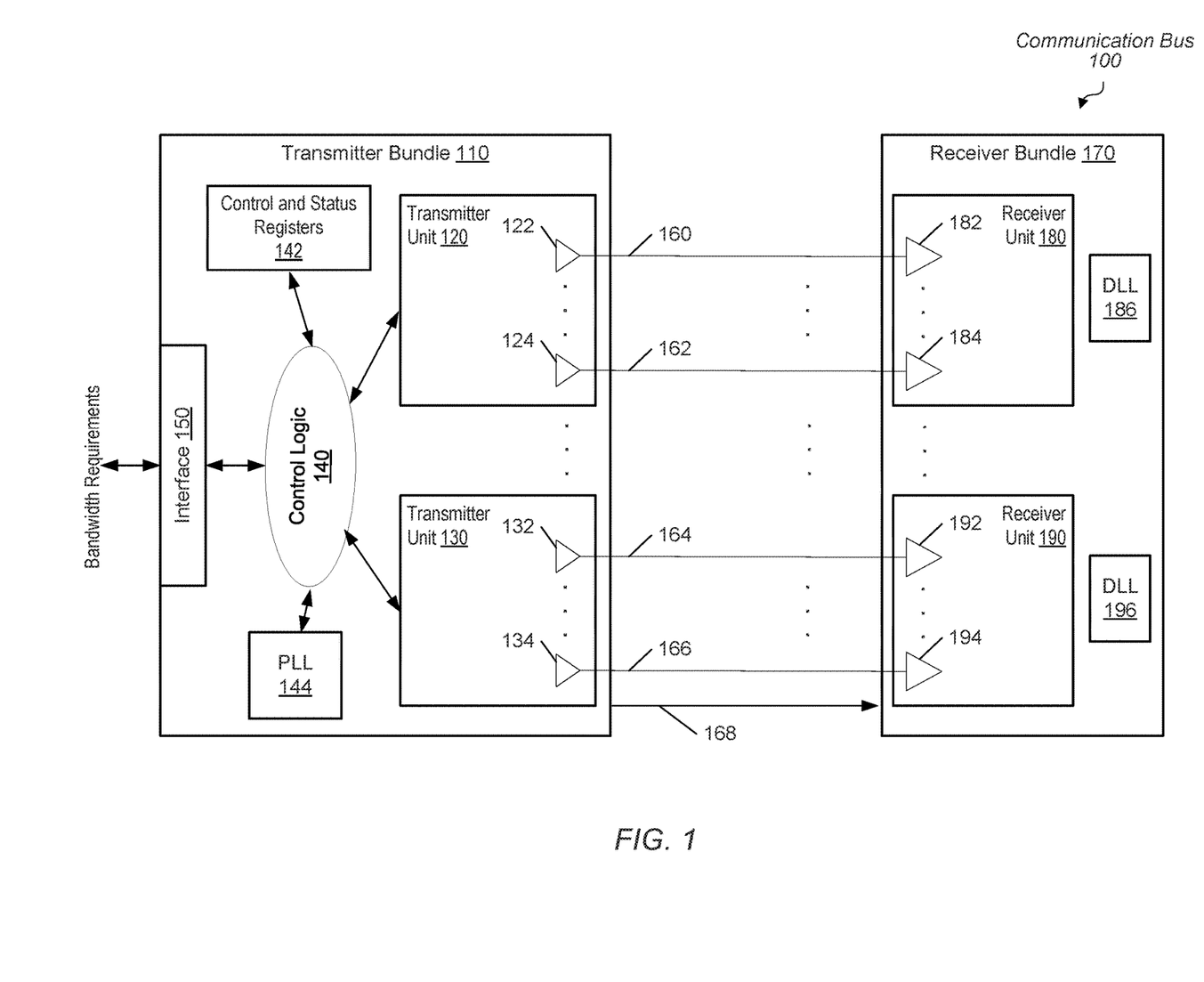
FIG. 1 is a block diagram of one embodiment of a communication bus.

Referring to FIG. 1, a generalized block diagram of one embodiment of a communication bus 100 is shown. In the illustrated embodiment, a transmitter bundle 110 sends information as electrical signals on transmission lines 160-166 to receiver bundle 170. Transmitter bundle 110 includes transmitter units 120-130 for sending the electrical signals, and receiver bundle 170 includes receiver units 180-190 for receiving the electrical signals. Control logic 140 in transmitter bundle 110 receives bandwidth requirements either from external system components through interface 150 or by generating the requirements based on received parameters. Control logic 140 changes the data rates of transmitter units 120 and 130 based on the received bandwidth requirement or other information in addition to the parameters stored in control and status registers (CSRs) 142.

In some cases, the transmitter bundle 110 and the receiver bundle 170 are within a same die, but in other cases, they are on separate dies. In some designs, each of the transmitter bundle 110 and the receiver bundle 170 is located within a bridge of a respective processing unit. It is noted that the terms "pin," "port," "terminal," and "node" are used interchangeably herein. It is also noted that the term "transmission line" may also be referred to as a "lane" and the term "bus" may also be referred to as a "channel." A lane may also be referred to as a "trace" or a "wire." In various designs, a link includes multiple lanes. In some designs, a link is a "unit" such as lanes 160-162 for transporting signals transmitted by transmitter unit 120. In other designs, a link includes multiple units, each with one or more lanes. In another example, a link includes lanes 160-166 for transporting signals transmitted by transmitter unit 120 and transmitter unit 130.

Transmitter unit 120 uses transmitters 122-124 for sending signals on lanes 160-162. Receiver unit 180 uses receivers 182-184 for receiving data on lanes 160-162. Similarly, transmitter unit 130 uses transmitters 132-134 for sending signals on lanes 164-166, which are received by receivers 192-194 in receiver unit 190. Lanes 160-166 are constructed from a variety of suitable metal sources during semiconductor fabrication and surrounded by a variety of any suitable insulating material.

In some embodiments, the signals sent from transmitters 122-134 to receivers 182-194 are single-ended data signals. The term "single-ended signal" is defined as an electric signal which is transmitted using a single signal conductor. For example, receiver 182 receives a single-ended signal from transmitter 122 via transmission line 160, which is a single signal conductor. In other embodiments, the signals sent from transmitters 122-134 to receivers 182-194 are differential data signals. In contrast to using single-ended data signals, sending information with differential data signals uses more lines and more pins. A reference signal is not generated and sent to multiple pins (or multiple receivers) when differential data signals are used. As is known in the art, differential signaling generally provides better noise immunity than single-ended signaling. However, the use of differential signaling comes at the added cost of extra pins and extra traces.

Transmitter bundle 110 utilizes a phase lock loop (PLL) 144 for generating a clock signal, which is used by transmitter units 120-130 and sent as clock signal 168 to receiver bundle 170. The delay lock loops (DLLs) 186 and 196 receive the clock signal 168 and generate clock signals used by receiver units 180 and 190. Although two transmission units 120 and 130 and two receiver units 180 and 190 are shown, in other embodiments, another number of transmission units and receiver units is used. In some designs, each of the transmitter units 120 and 130 sends signals on a same number of transmission lines, whereas, in other designs, transmitter unit 120 sends signals on a different number of transmission lines than transmitter unit 130.

In some cases, control logic 140 receives an indication to change a bandwidth requirement for transmitter bundle 110. In some embodiments, the bandwidth is an aggregate bandwidth measured as a data rate across lanes 160-166 whether one or not one or more of the lanes 160-166 are unused. The aggregate bandwidth is an amount of payload data used by applications and sent over lanes 160-166 within a given period of time, and again, whether one or not one or more of the lanes 160-166 are unused. Therefore, the aggregate bandwidth is different from a per-lane bandwidth. In other embodiments, the bandwidth requirement and subsequent change in the bandwidth requirement, is a per-lane bandwidth requirement. Therefore, as used herein, a "target bandwidth" includes one or more of an aggregate bandwidth (or an aggregate data rate) and a per-lane bandwidth (or a per-lane data rate). One example of a target bandwidth requirement is an aggregate bandwidth of 400 gigabits per second (10 Gbps). In other examples, this same target bandwidth requirement is a 10 Gbps per lane data rate for 40 lanes when all 40 lanes are transporting payload data.

In addition to changing the target bandwidth, which is specified as one of an aggregate bandwidth and a per-lane bandwidth, control logic 140 is also capable of changing the number of lanes 160-166 that are used for transporting payload data. In some examples each of the lanes 160-166 undergoes a same data rate change. However, the lanes 160-166 are not changed simultaneously. Rather, control logic 140 directs payload data for transport to one or more of the lanes 160-166 while one or more other lanes of lanes 160-166 undergo a data rate change and transport training data. Therefore, the aggregate bandwidth does not drop to zero during the data rate change. The payload data is separate from data used during the training of lanes 160-166.

In order to set the data rate of transmitters 122-134, control logic 140 adjusts one or more PLLs such as PLL 144. The PLL 144 is used to generate a source clock signal, which is routed through transmitter units 120 and 130 and as external clock signal 168. Receiver bundle 170 receives the clock signal 168 and routes it to the DLLs 186 and 196. Therefore, transmitters 122-134 and receivers 182-194 are synchronized with one another. The transmitter bundle 110 uses one or more types of PLLs to generate the source clock signal such as an integer PLL or a fractional PLL.

Whether the bandwidth requirement is an aggregate bandwidth requirement or a per-lane bandwidth requirement, the indication of the bandwidth requirement is received through interface 150 from an external system component. One example of such a component is the operating system scheduler assigning tasks to hardware such as processors within particular processing units. To maintain throughput of these processors, the bandwidth requirement increases as processing throughput increases. Alternatively, if the number of tasks reduce below a threshold, the bandwidth requirement decreases. In some cases, the indication of a bandwidth requirement is directly a target value for the bandwidth requirement. In other cases, the indication is a number of tasks or other indicator of a workload being processed that control logic 140 uses to determine a target bandwidth.

Another example of an external component providing an indication of a bandwidth requirement is a power manager. Again, in some cases, the power manager directly sends a target value for the bandwidth requirement, whereas in other cases, the power manager sends an indication of new power-performance states (P-states) for processors in the computing system. This received information is used by control logic 140 to determine a target bandwidth. Yet another example of an external component providing an indication of a bandwidth requirement is an agent, which includes transmitter bundle 110 within a bridge. In some cases, one or more processors within the agent sends an activity level to control logic 140 for determining the target bandwidth. In some embodiments, control logic 140 includes hardware circuitry for implementing the algorithm for assigning data rates to transmitters 122-134. In other embodiments, control logic 140 is software located externally from the transmitter bundle 110. In yet other embodiments, control logic 140 is implemented as a combination of hardware and software.

As described above, in some cases, control logic 140 receives information to use to determine a target bandwidth, which is also referred to as a target data rate, for transmitters 122-134. Examples of the received information are an incoming rate of transactions, a completion rate for transactions, a rate of allocation and/or deallocation of particular buffers such as data buffers and command buffers in a communication fabric or within transmitter bundle 110, a power-performance state (P-state) for transmitter bundle 110, P-states for multiple processors within the source and the destination, a number of credits to push transactions from the source, one or more activity levels, and so forth. As part of the algorithm for determining the target data rate for transmitters 122-134, control logic 140 compares one or more of the received parameters to thresholds stored in CSRs 142.

When the control logic 140 either receives an indication of a bandwidth requirement change or determines a change from received parameters, the control logic 140 begins a process to change data transport on lanes 160-166 from an initial first data rate to a different, target second data rate. To do so, the control logic 140 sends messages across one or more of the lanes 160-166 to the receiver bundle 170. The messages indicate that the data rate is going to change and reconfiguration of one or more of the lanes 160-166 will be performed. Lanes of lanes 160-166 that do not currently transport data and are not selected to transport data with the target data rate remain unused, and therefore, these lanes are not reconfigured.

Control logic 140 selects one or more lanes of lanes 160-166 for transporting data at the target second data rate. The control logic 140 maintains data transport at the first data rate while reconfiguring the selected one or more lanes to the second data rate. After completing the reconfiguration, the control logic 140 transports data at the second data rate on the selected one or more lanes while preventing data transport on any unselected lanes. Therefore, the bandwidth is dynamically changed while applications are processed without the available bandwidth dropping to zero.

Figure 2:
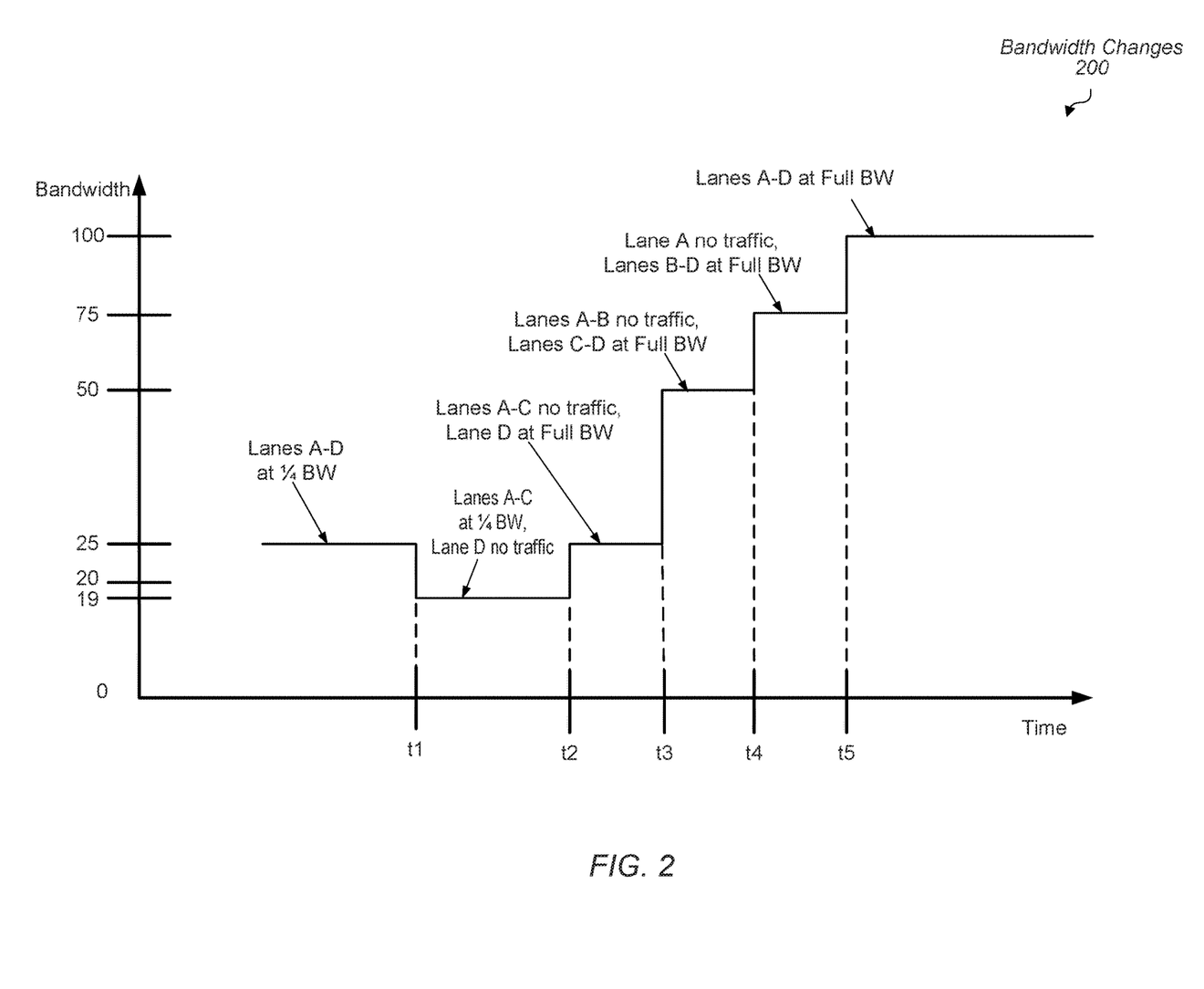
FIG. 2 is a block diagram of one embodiment of bandwidth changes.

Turning to FIG. 2, a waveform showing aggregate bandwidth and configurations of different lanes over time illustrates one embodiment of bandwidth changes 200 is shown. Five points in time from t1 to t5 are shown, each with a different available bandwidth than a previous point in time. The available aggregate bandwidth measured on the y-axis is for four lanes labeled as lane A, lane B, lane C and lane D. Time is measured on the x-axis. Immediately prior to time t1, each of the lanes A-D transports payload data at one quarter of the full bandwidth. For example, each of the lanes A-D transports payload data at a quarter of the maximum clock frequency. Therefore, the per-lane bandwidth is one fourth of the available full lane bandwidth of the interface for each of the lanes A-D, and additionally, the aggregate bandwidth is 25% of the full bandwidth capacity of the interface.

Prior to time t1, control logic in the transmitter receives an indication to operate each of the lanes A-D at full, or 100%, bandwidth. At time t1, the control logic in the transmitter adjusts the transport rate of lane D from one quarter of the per-lane bandwidth to no data transport, and routes all data to lanes A-C. Accordingly, the available aggregate bandwidth for lanes A-D decreases from ¼ of the full bandwidth to 3/16 of the full bandwidth. At or shortly after the point in time t1, which is also referred to as time t1, the control logic begins a reconfiguration process for lane D. For example, control logic and analog circuitry on the transmitter side and the receiver side of lane D maintains the appropriate voltage levels for signals, but synchronizes the signals to the timing relative to a new clock frequency. Control logic and analogic circuitry at the receiver recovers the received data and converts it into digital data. Control logic on the transmitter and the receiver manage the flow of information and messages while training data is sent across lane D. This reconfiguration process is also referred to as "training." The training of lane D lasts from time t1 to time t2.

At time t2, lane D begins transporting payload data for applications while lanes A-C transport no payload data. Rather, training begins for lanes A-C to reconfigure them from transporting data at ¼ of their per-lane bandwidth to transporting data at their full per-lane bandwidth. Training for lanes A-C lasts from time t2 to time t3. From time t2 to time t3, the available aggregate bandwidth for the system is one quarter of the full aggregate bandwidth as lane D transports payload data for applications at its full per-lane bandwidth. It is noted that the system aggregate bandwidth did not reduce to zero at any time, even though the per-lane bandwidth for transporting payload data of individual lanes did reduce to zero at different times.

At times t3, t4 and t5, each of the lanes A-C begin transporting payload data for applications one at a time. The staggered start reduces signal overshoot and noise from cross-coupling effects on lanes A-D such as supply noise coupling. At time t3, lane C begins transporting payload data for applications at its full per-lane bandwidth. Therefore, the system aggregate bandwidth increases from one quarter of the full aggregate bandwidth to one half of the full aggregate bandwidth. At time t4, lane B begins transporting payload data for applications at its full per-lane bandwidth. Therefore, the system aggregate bandwidth increases from one half of the full aggregate bandwidth to three quarters of the full aggregate bandwidth. At time t5, lane A begins transporting payload data for applications at its full per-lane bandwidth. Therefore, the system aggregate bandwidth increases from three quarters of the full aggregate bandwidth to the full aggregate bandwidth. During the change from one quarter to full aggregate bandwidth, the system aggregate bandwidth did not decrease to zero.

In the above example, the threshold percentage of the aggregate bandwidth to remain above was zero. However, in other embodiments, a different threshold is used. For example, if a threshold of 15% of the full aggregate bandwidth is set as a threshold, then control logic in the transmitter is unable to prevent data transport on two of the lanes A-D at time t1. If so, then, in one example, lanes C-D no longer transport payload data for applications while reconfiguration begins. As a result, the system aggregate bandwidth would be set at 2/16 (one eighth) of the system full aggregate bandwidth, since lanes A-B continue to transport payload data at one quarter of their individual full per-lane bandwidth. However, one eighth of the system full aggregate bandwidth is 12.5%, which is less than the 15% threshold. Therefore, only one of the lanes A-D begins reconfiguration at time t1. If the threshold is set at 10%, then control logic in the transmitter is capable of reconfiguring two of the lanes A-D at time t1, but not three lanes.

Figure 3:
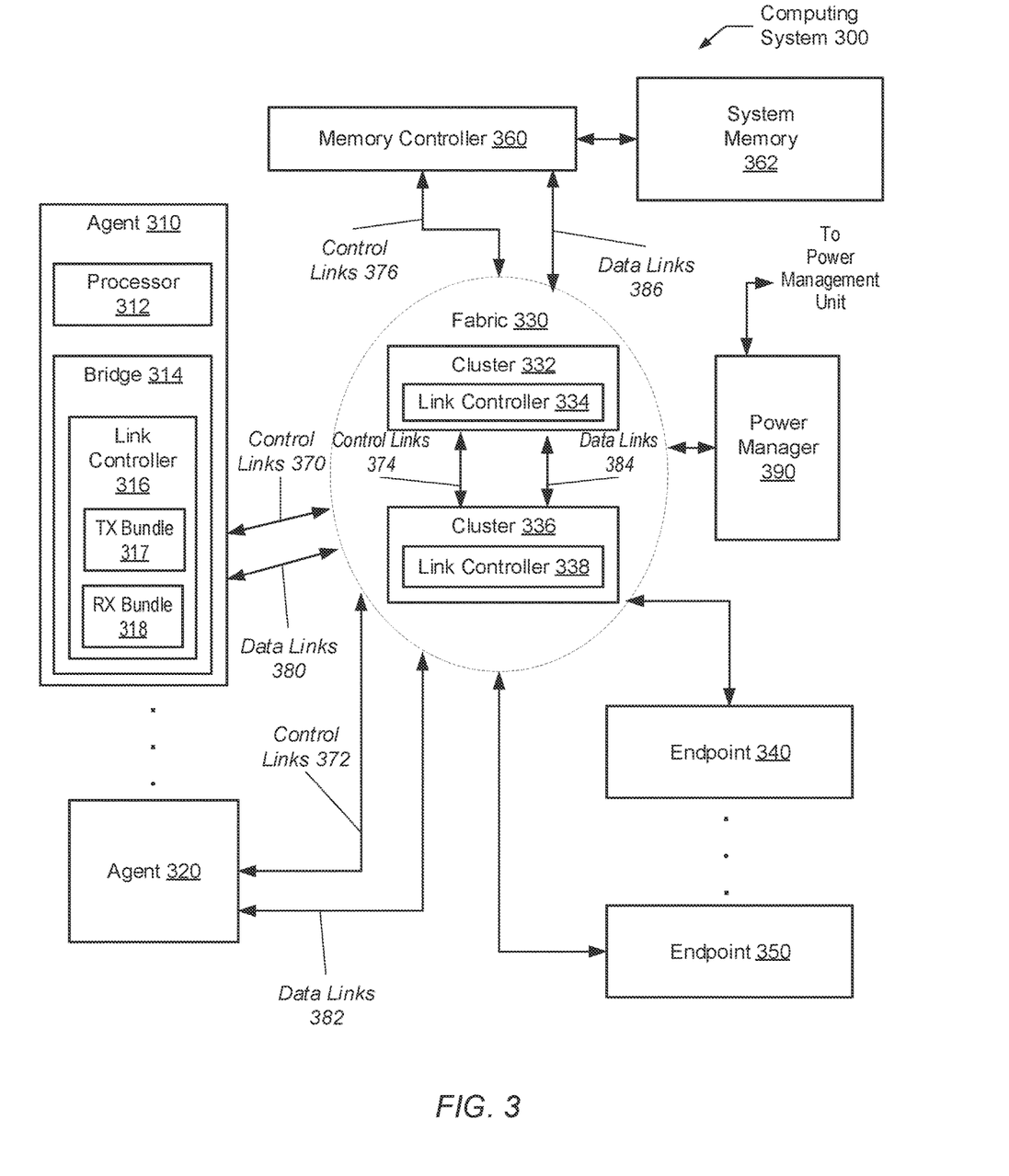
FIG. 3 is a block diagram of one embodiment of a computing system.

Referring now to FIG. 3, a generalized block diagram illustrating one embodiment of a computing system 300 is shown. In the illustrated embodiment, communication fabric 330 (or fabric 330) routes traffic among agents 310-320 and endpoints 340-350. The "traffic" flowing through fabric 330 refers to one or more of access requests, messages, and data corresponding to the access requests and the messages. In various embodiments, the computing system 300 is a system on a chip (SoC) that includes multiple types of integrated circuits on a single semiconductor die, each integrated circuit providing a separate functionality. In some embodiments, computing system 300 is also referred to as an application specific integrated circuit (ASIC), or an apparatus. In other embodiments, the agents 310-320 and endpoints 340-350 are individual dies within a package such as a multi-chip module (MCM). In yet other embodiments, the agents 310-320 and endpoints 340-350 are individual dies or chips on a printed circuit board.

Clock sources, such as phase lock loops (PLLs), interrupt controllers, and so forth are not shown in FIG. 3 for ease of illustration. It is also noted that the number of components of the computing system 300 vary from embodiment to embodiment. In other embodiments, there are more or fewer of each component than the number shown for the computing system 300. Each of the agents 310-320 is a processor complex. The term "processor complex" is used to denote a configuration of one or more processor cores using local storage (not shown), such as a local shared cache memory subsystem, and capable of processing a workload together. For example, in an embodiment, the workload includes one or more programs comprising instructions executed by processor 312. Any instruction set architecture is implemented.

Although a single processor, such as processor 312, is shown, in various embodiments, multiple processors are used, each with one or more processor cores. Processor 312 is one or more of a central processing unit (CPU), a data parallel processor like a graphics processing units (GPU), a digital signal processors (DSP), a multimedia engine, and so forth. In some designs, components within agent 320 are similar to components in agent 310. In other designs, components in agent 320 are designed for lower power consumption, and therefore, include control logic and processing capability producing less performance. In such cases, supported clock frequencies in agent 320 are less than supported clock frequencies in agent 310. In addition, one or more of the processor cores in agent 320 include a smaller number of execution pipelines and/or functional blocks for processing relatively high power consuming instructions than what is supported by the processor cores in agent 310.

Endpoints 340-350 are representative of any number and type of components coupled to fabric 330. For example, in some embodiments, endpoints 340-350 include one or more cameras, flash controllers, display controllers, media controllers, graphics units, communication interfaces such as radio communication interfaces, and/or other devices. Endpoints 340-350 are also representative of any number of input/output (I/O) interfaces or devices and provide interfaces to any type of peripheral device implementing any hardware functionality included in computing system 300. For example, in an embodiment, any of the endpoints 340-350 connect to audio peripherals such as microphones, speakers, interfaces to microphones and speakers, audio processors, digital signal processors, mixers, etc. Other I/O devices include interface controllers for various interfaces external to computing system 300, including interfaces such as Universal Serial Bus (USB), peripheral component interconnect (PCI) including PCI Express (PCIe), serial and parallel ports, general-purpose I/O (GPIO), a universal asynchronous receiver/transmitter (uART), a FireWire interface, an Ethernet interface, an analog-to-digital converter (ADC), a digital-to-analog converter (DAC), and so forth. Other I/O devices include networking peripherals such as media access controllers (MACs).

In yet other embodiments, one or more of endpoints 340-350 include memory controllers for interfacing with system memory or separate memory such as a portable flash memory device. As shown, memory controller 360 is used to interface with system memory 362. Memory controller 360 sends read response data from system memory 362 to agents 310-320 and endpoints 340-350. Memory controller 360 additionally sends write data to system memory 362. In many designs, memory controller 360 is used as a single ordering point. Memory controller 360 includes any number of memory ports, generates proper clocking to memory devices, and interfaces to system memory 362. System memory 362 includes one or more of dynamic random access memory (DRAM) such as synchronous DRAM (SDRAM) (including mobile versions of the SDRAMs such as mDDR3, etc., and/or low power versions of the SDRAMs such as LPDDR4, etc.), RAMBUS DRAM (RDRAM), double data rate (DDR) SDRAM, DDR2 SDRAM, Rambus DRAM (RDRAM), static RAM (SRAM), GDDR4 (Graphics Double Data Rate, version 4) SDRAM, GDDR5 (Graphics Double Data Rate, version 5) SDRAM, etc.

In various embodiments, agents 310-320 and endpoints 340-350 transfer messages and data to one another through fabric 330. In various embodiments, fabric 330 includes a hierarchy of clusters between agents 310-320 and memory controller 360. Although two clusters 332 and 336 are shown, any number of clusters are possible and contemplated. Between each hierarchical level of fabric hierarchy of fabric 330 are multiple links. Each link includes multiple lanes. In some designs, a link is a "unit" as described earlier for communication bus 100 (of FIG. 1). In other designs, a link includes multiple units, each with one or more lanes.

The link interfaces, such as link controllers 316, 334 and 338, include communication protocol connections such as PCIe (Peripheral Component Interconnect Express), Advanced eXtensible Interface (AXI), InfiniBand, RapidIO, and so forth. Clusters 332 and 336 include one or more buffers (not shown) for storing transactions and corresponding payload data during transport. Clusters 332 and 336 also include control logic (not shown) for selecting transactions to send from a source to a destination. Between each hierarchical level are multiple links. Again, each link includes one or more units, and each unit includes one or more lanes.

For functionality and performance reasons, a split topology is used where the data links 384 in fabric 330 are physically separated from the control links 374. Similarly, the interfaces to fabric 330 use a split topology. As shown, agent 310 uses control links 370 and separate data links 380. Although a split topology is not shown for endpoints 340-350, in various embodiments, endpoints 340-350 also use a split topology. Control links 370-378 transfer commands and messages, whereas, data links 380-386 transfer data corresponding to the commands and messages.

The commands include read requests and write requests, and the messages indicate when response data is ready and provide an index of where the response data is stored. The data corresponding to the commands and messages include write data being sent from an agent, such as agent 310, to memory controller 360. The data also include read response data from memory controller 360 to an agent such as agent 310.

One or more of the control links 370-378 and data links 380-386 are a point-to-point communication channel. At the physical level, a link includes one or more lanes. In various embodiments, link interfaces, such as link controllers 316, 334 and 338, include split resources with control resources being used for processing commands and messages and separate data resources being used for processing data corresponding to the commands and messages. In various embodiments, the split resources include a combination of combinatorial logic and sequential elements for storing traffic, selecting traffic to process, such as using arbitration logic, sending the selected traffic on corresponding links and determining when to change one or more of the per-lane bandwidth and the aggregate bandwidth of payload data being transported.

In some embodiments, the resources in link interfaces, such as bridge 314 and link controllers 334 and 338, include control logic for determining when to change the one or more of the per-lane bandwidth and the aggregate bandwidth of data transport. For example, link controller 316 is shown to include transmitter bundle 317 (TX bundle 317) and receiver bundle 318 (RX bundle 318). In various embodiments, transmitter bundle 317 and receiver bundle 318 include the functionality of transmitter bundle 110 and receiver bundle 170 as illustrated earlier in FIG. 1. Although not shown, link controllers 334 and 338 also include corresponding transmitter bundles and receiver bundles. Although a single transmitter bundle 317 is shown, in various embodiments, bridge 314 includes at least two transmitter bundles such as one for data links and one for control links. Similarly, although now shown, bridge 314 includes at least two receiver bundles.

As described earlier, the target bandwidth includes one or more of the per-lane bandwidth and the aggregate bandwidth for data transport. In some cases, when one link controller determines to change the target bandwidth of data transport, the link controller sends messages to other link controllers in upper levels of the hierarchy. For example, when link controller 316 determines to change the target bandwidth of data transport, it sends messages to one or more of link controllers 334 and 338 indicating the upcoming change. In some designs, the functionality of link controllers 316, 334 and 338 is implemented in hardware such as circuitry. In other designs, the functionality of link controllers 316, 334 and 338 is implemented in a combination of hardware and software.

Fabric 330 uses one or more bus protocols for transferring messages and data, enforcing an order between transactions with particular transaction types, and ensuring cache coherence among the different agents 310-320 and endpoints 340-350. The supported communication protocols determine allowable transfer sizes, supported burst transfer sizes, supported directions for simultaneous transfers, allowable number of outstanding requests while sending more requests, support of out-of-order completions, supported clock domains, supported interrupt mechanisms, and so forth.

Clusters 332 and 336 include control logic (not shown) for selecting transactions to send from a source to a destination. For example, multiple multiplexers (or muxes) are used. In such embodiments, agents 310-320 and endpoints 340-350 include fabric interface units. Different types of traffic flows independently through fabric 330. In some cases, fabric 330 utilizes a single physical fabric bus to include a number of overlaying virtual channels, or dedicated source and destination buffers, each carrying a different type of traffic. Each channel is independently flow controlled with no dependence between transactions in different channels. In other cases, the communication fabric is packet-based, and is hierarchical with bridges, cross bar, point-to-point, or other interconnects.

In various embodiments, power manager 390 controls the supply voltage magnitudes requested from the external power management unit. In some embodiments, one or more supply voltages generated by the external power management unit are provided to the components of the computing system 300. In some embodiments, logic local to various components control the power states of the components, including power up and power down and various other power-performance states (P-states) and operating modes for those components that support more than one P-state and operating mode. In various embodiments, the P-state is used to determine the operational voltage and operational frequency used by a component, whereas the operating mode determines how many sub-components are powered up such as particular execution pipelines.

In other embodiments, the power manager 390 controls power up and power down of other components of the computing system 300, or a combination of local control for some components and control by the power manager 390 for other components are supported. In an embodiment, the power manager 390 is under direct software control (e.g. software may directly request the power up and/or power down of components) and/or monitors the computing system 300 and determines when various components are to be powered up or powered down.

The external power management unit generally includes the circuitry to generate supply voltages and to provide those supply voltages to other components of the system such as the computing system 300, the off-die memory, various off-chip peripheral components (not shown in FIG. 3) such as display devices, image sensors, user interface devices, etc. In an embodiment, the external power management unit includes programmable voltage regulators, logic to interface to the computing system 300 and more particularly the power manager 390 to receive voltage requests, etc.

Figure 4:
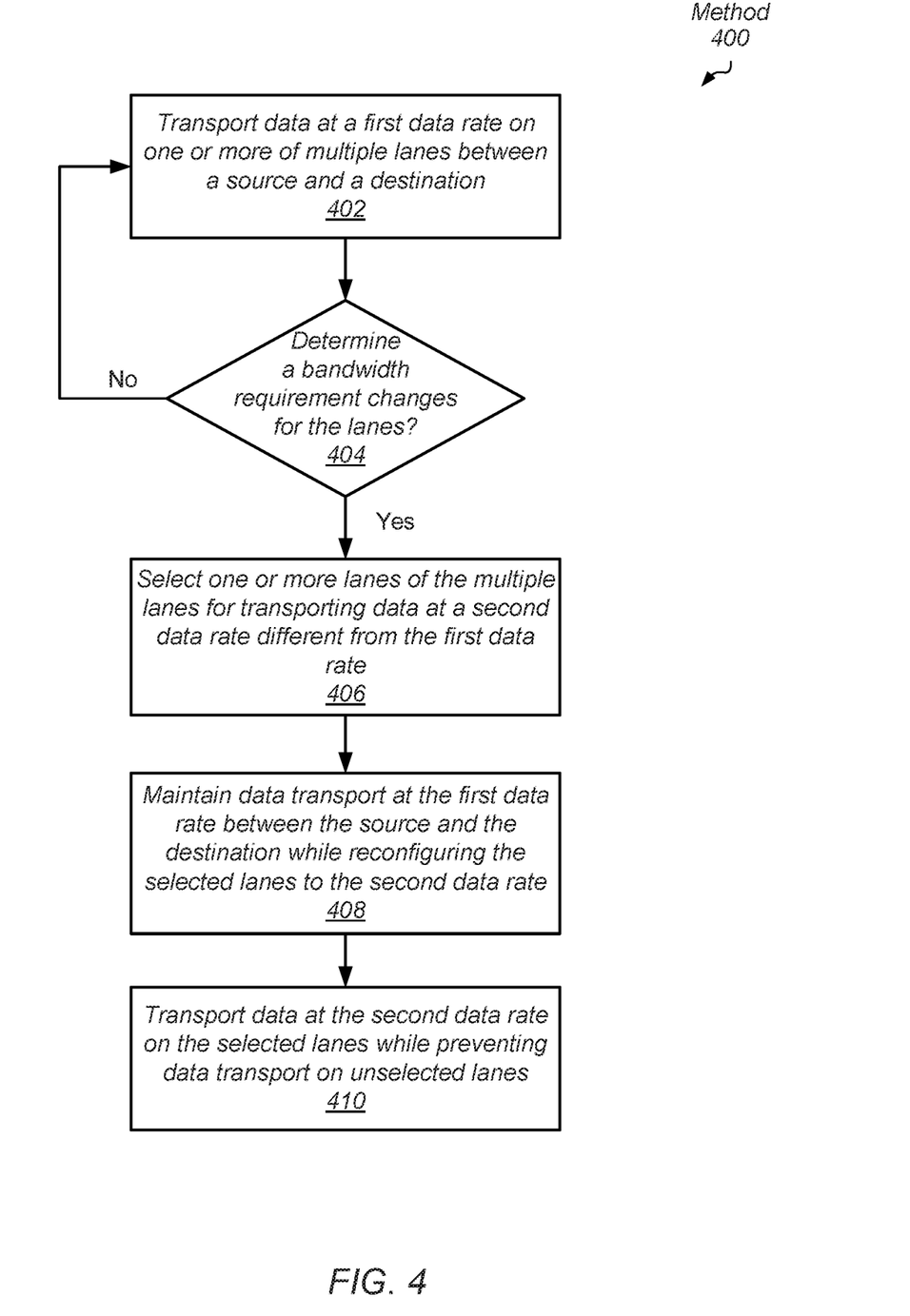
FIG. 4 is a flow diagram of one embodiment of a method for efficiently transporting data across lanes.

Referring now to FIG. 4, a generalized flow diagram of one embodiment of a method 400 for efficiently transporting data across lanes is shown. For purposes of discussion, the steps in this embodiment (as well as for FIG. 5) are shown in sequential order. However, in other embodiments some steps may occur in a different order than shown, some steps may be performed concurrently, some steps may be combined with other steps, and some steps may be absent.

A computing system includes one or more link controllers for determining when to change data rates on lanes and changing the data rates while preventing the interface target bandwidth from falling below a threshold. The link controllers manage data transport on multiple lanes. In some designs, one or more link controllers incorporate the functionality of transmitter bundle 110 and receiver bundle 170 as illustrated in FIG. 1. In some designs, the lanes are organized into units and the units are organized into links. A link controller manages transmitters that transport payload data for applications at a first data rate on one or more of multiple lanes between a source and a destination (block 402). Control logic in the link controller determines when a target bandwidth change should occur. In one example, an indication is received from an external component to change the target bandwidth to a target second data rate. Examples of the external component are an operating system scheduler, a power manager and one or more processors within a processing unit or agent using the link controller. In another example, the link controller receives parameters from external components and determines the target second data rate.

If the bandwidth requirement does not change for the lanes ("no" branch of the conditional block 404), then control flow of method 400 returns to block 402 where the transmitters on the source transport payload data to a receiver on the destination at the first data rate. However, if the bandwidth requirement changes for the lanes ("yes" branch of the conditional block 404), then the control logic in the link controller selects one or more lanes of the multiple lanes for transporting data at a second data rate different from the first data rate (block 406).

The link controller maintains data transport at the first data rate between the source and the destination while reconfiguring the selected lanes to the second data rate (block 408). Therefore, the interface aggregate bandwidth does not fall to zero. In some designs, a positive non-zero threshold is used to determine how many lanes simultaneously stop transporting data and reconfigure to the second data rate while other lanes continue transporting data at the first data rate.

Control logic in the link controllers at both the source and the destination perform training (reconfiguration) for the selected lanes. After training completes, the link controller transports payload data for the running applications at the second data rate on the selected lanes while preventing data transport on unselected lanes (block 410). Therefore, the bandwidth is dynamically changed while applications are processed without the available bandwidth dropping to zero.

Figure 5:
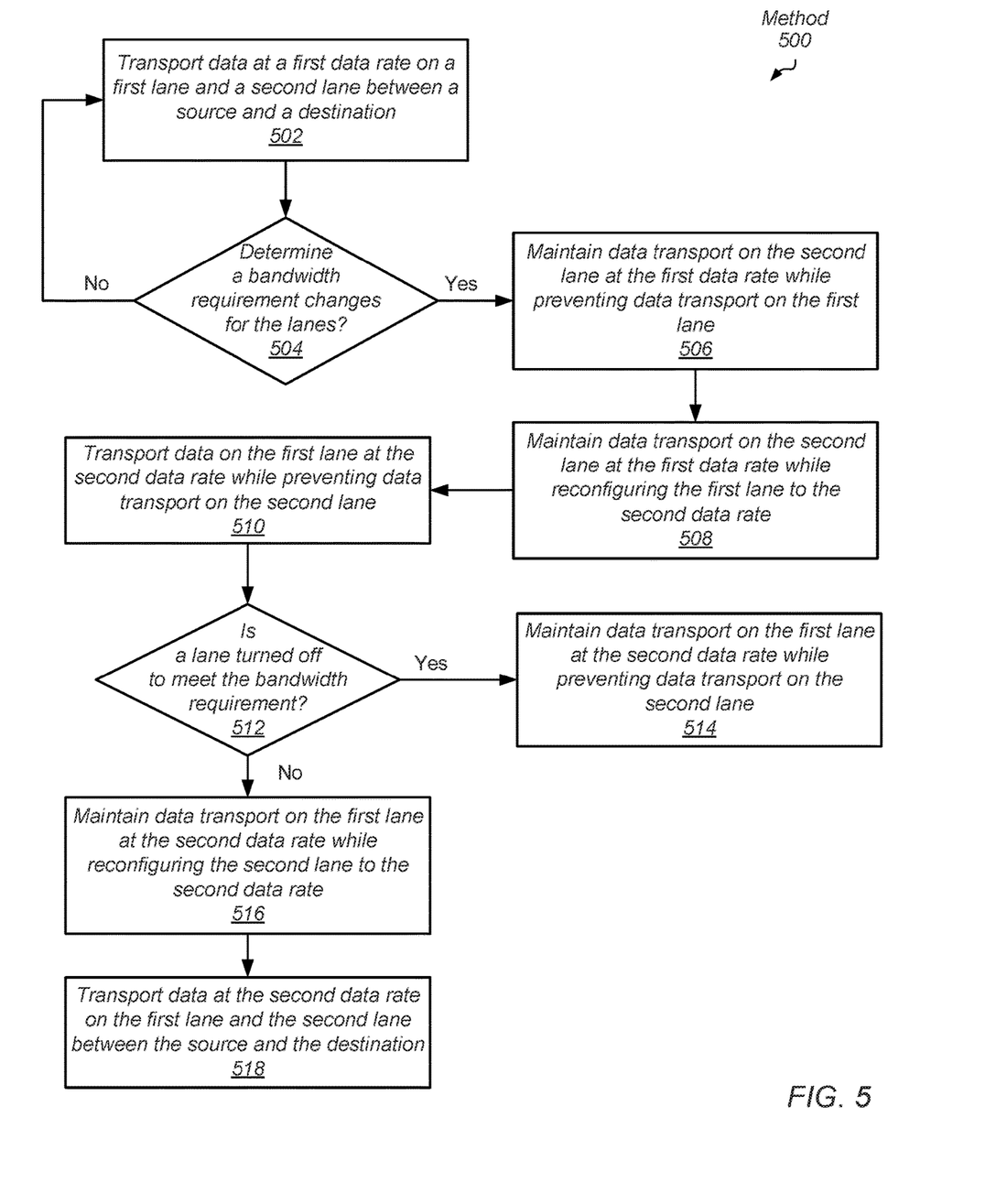
FIG. 5 is a flow diagram of one embodiment of a method for efficiently transporting data across lanes.

Turning now to FIG. 5, a generalized flow diagram of one embodiment of a method 500 for efficiently transporting data across lanes is shown. In several designs, the lanes for transporting data are organized into units and the units are organized into links. A link controller manages data transport on multiple lanes. For example, the link controller manages transmitters that transport payload data for applications at a first per-lane data rate on a first lane and a second lane between a source and a destination (block 502).

When the transmitter transports data one the first lane and the second lane with no other available lanes, the "per-lane data rate" is also referred to as the "data rate", and vice-versa. In such cases, the per-lane data rate is equal to the aggregate data rate. However, when other lanes are available, but currently not transporting data, then the per-lane data rate is not equal to the aggregate data rate. The examples shown earlier in FIG. 2 highlight these cases. As described earlier, control logic in the link controller determines when a target bandwidth change should occur. In one example, an indication is received from an external component to change the target bandwidth to a target second data rate. In another example, the link controller receives parameters from external components and determines the target second data rate.

If the bandwidth requirement does not change for the lanes ("no" branch of the conditional block 504), then control flow of method 500 returns to block 502 where the transmitters for the first land and the second lane transport payload data to a receiver on the destination at the first data rate. However, if the bandwidth requirement changes for the lanes ("yes" branch of the conditional block 504), then the control logic in the link controller maintains data transport on the second lane at the first data rate while preventing data transport on the first lane (block 506). Therefore, the interface aggregate bandwidth does not fall to zero. The link controller maintains data transport on the second lane at the first data rate while reconfiguring the first lane to the second data rate (block 508). Control logic in the link controllers at both the source and the destination perform training (reconfiguration) for the first lane.

The link controller transports data on the first lane at the second data rate while preventing data transport on the second lane (block 510). The link controller now uses the target data rate for at least the first lane. If a lane is to be turned off to meet the aggregate bandwidth requirement ("yes" branch of the conditional block 512), then the link controller maintains data transport on the first lane at the second data rate while preventing data transport on the second lane (block 514). In such a case, only the first lane of the two lanes now transports data, and does so with the target second data rate.

If no lane is to be turned off to meet the aggregate bandwidth requirement ("no" branch of the conditional block 512), then the link controller maintains data transport on the first lane at the second data rate while reconfiguring the second lane to the second data rate (block 516). Control logic in the link controllers at both the source and the destination perform training (reconfiguration) for the second lane. The link controller transports data at the second data rate on the first lane and the second lane between the source and the destination (block 518). Therefore, the link controller determines when to change data rates on lanes and changes the data rates while preventing the interface bandwidth from falling below a threshold.

Figure 6:
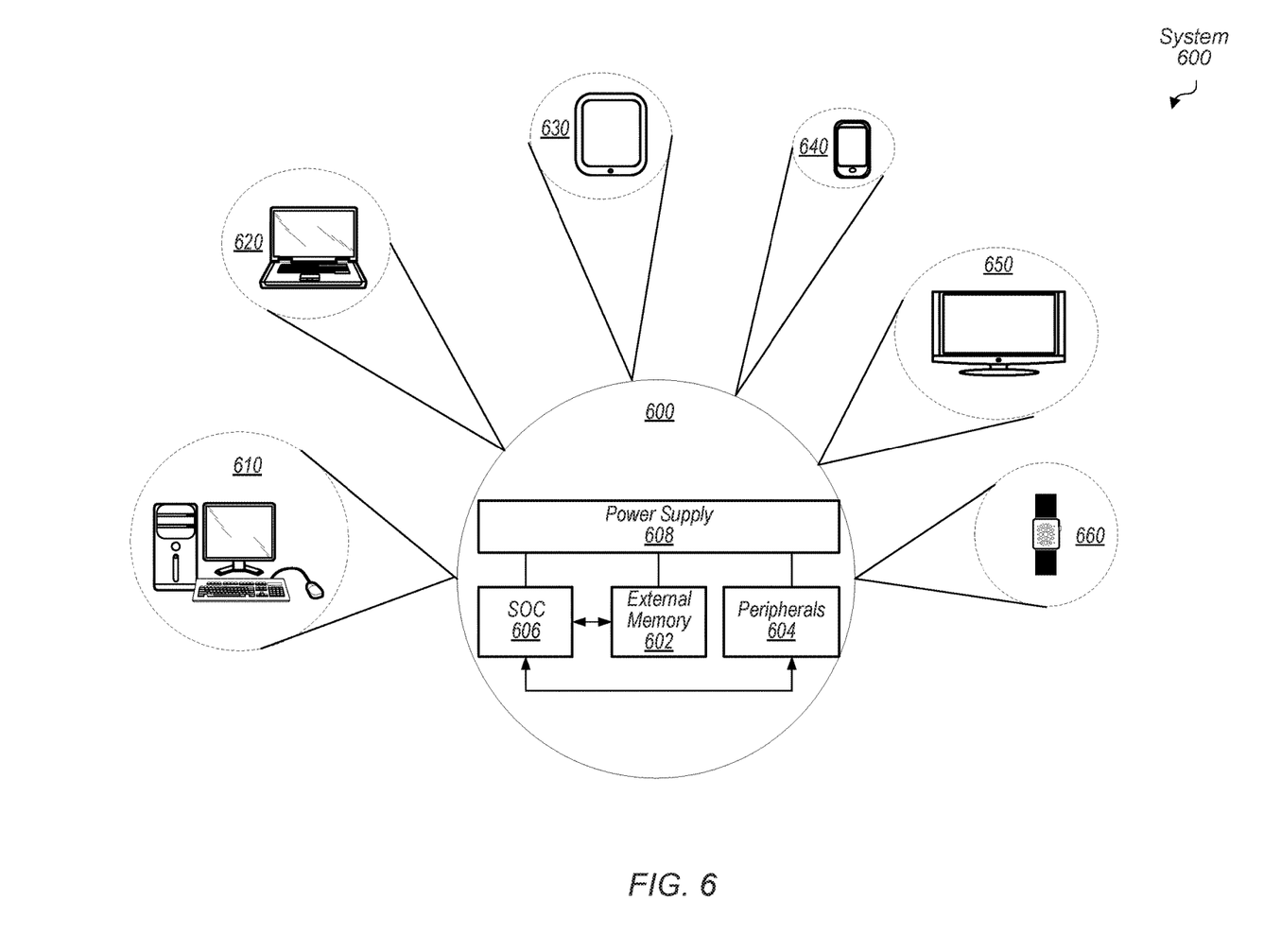
FIG. 6 is a block diagram of one embodiment of a system.

Turning next to FIG. 6, a block diagram of one embodiment of a system 600 is shown. As shown, system 600 represents chip, circuitry, components, etc., of a desktop computer 610, laptop computer 620, tablet computer 630, cell or mobile phone 640, television 650 (or set top box coupled to a television), wrist watch or other wearable item 660, or otherwise. Other devices are possible and are contemplated. In the illustrated embodiment, the system 600 includes at least one instance of a system on chip (SoC) 606 which includes multiple agents, a communication fabric, and one or more link controllers for determining when to change data rates on lanes and changing the data rates while preventing the interface bandwidth from falling below a threshold. For example, in some embodiments, SoC 606 includes components similar to communication bus 100 (of FIG. 1) and computing system 300 (of FIG. 3). In various embodiments, SoC 606 is coupled to external memory 602, peripherals 604, and power supply 608.

A power supply 608 is also provided which supplies the supply voltages to SoC 606 as well as one or more supply voltages to the memory 602 and/or the peripherals 604. In various embodiments, power supply 608 represents a battery (e.g., a rechargeable battery in a smart phone, laptop or tablet computer). In some embodiments, more than one instance of SoC 606 is included (and more than one external memory 602 is included as well).

The memory 602 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 604 include any desired circuitry, depending on the type of system 600. For example, in one embodiment, peripherals 604 includes devices for various types of wireless communication, such as Wi-Fi, Bluetooth, cellular, global positioning system, etc. In some embodiments, the peripherals 604 also include additional storage, including RAM storage, solid state storage, or disk storage. The peripherals 604 include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computer during use to provide the program instructions and accompanying data to the computer for program execution. In some embodiments, a synthesis tool reads the program instructions in order to produce a netlist including a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
 a plurality of transmitters configured to transmit data via a communication fabric; and
 control logic;
 wherein in response to detecting a bandwidth requirement change for transmission of data via the communication fabric, the control logic is configured to:
  use a percentage of a target bandwidth to determine how many transmitters should stop transmitting data to be reconfigured from a first data rate to a second data rate; and
  reconfigure a first number of transmitters of the plurality of transmitters while maintaining data transport by a second number of transmitters of the plurality of transmitters, wherein the first number of transmitters are chosen such that the second number of transmitters transmitting data at the first data rate meets the percentage of the target bandwidth during reconfiguration.

2. The apparatus as recited in claim 1, wherein subsequent to reconfiguring the first number of transmitters, the control logic is configured to transmit data at the second data rate via the first number of transmitters while preventing data transmission by the second number of transmitters.

3. The apparatus as recited in claim 1, wherein subsequent to reconfiguring the first number of transmitters, the control logic is configured to reconfigure the second number of transmitters to enable the second number of transmitters to transmit data at the second data rate.

4. The apparatus as recited in claim 3, wherein the control logic is further configured to prevent data throughput from falling below the percentage of the target bandwidth during reconfiguration of the second number of transmitters.

5. The apparatus as recited in claim 4, wherein during reconfiguration the control logic is further configured to reduce a number of transmitters of the second number of transmitters being reconfigured responsive to data throughput falling below the threshold percentage of the target bandwidth.

6. The apparatus as recited in claim 1, wherein the target bandwidth is specified as an aggregate bandwidth.

7. The apparatus as recited in claim 1, wherein the target bandwidth is specified as a per-lane bandwidth.

8. A method comprising:
 transporting, by a plurality of transmitters, data at a first data rate via a communication fabric;
 responsive to detecting a bandwidth requirement change for transmission of data via the communication fabric:
  using a threshold percentage to determine how many transmitters should stop transporting data to be reconfigured to a second data rate; and
  reconfiguring a first number of lanes of the plurality of transmitters while maintaining data transport by a second number of transmitters of the plurality of transmitters, wherein the first number of transmitters are chosen such that the second number of transmitters transporting data at the first data rate meets the threshold percentage of the target bandwidth during reconfiguration.

9. The method as recited in claim 8, wherein subsequent to reconfiguring the first number of transmitters, the method further comprising transporting data at the second data rate by the first number of transmitters while preventing data transport by the second number of transmitters.

10. The method as recited in claim 8, wherein subsequent to reconfiguring the first number of transmitters, the method further comprising reconfiguring the second number of transmitters to enable the second number of transmitters to transmit data at the second data rate.

11. The method as recited in claim 10, further comprising preventing data throughput from falling below the threshold percentage of the target bandwidth during reconfiguration of the second number of transmitters.

12. The method as recited in claim 11, further comprising reducing a number of transmitters of the second number of transmitters being reconfigured responsive to data throughput falling below the threshold percentage of the target bandwidth during reconfiguration.

13. The method as recited in claim 8, wherein the target bandwidth is specified as an aggregate bandwidth.

14. The method as recited in claim 8, wherein the target bandwidth is specified as a per-lane bandwidth.

15. A system comprising:
a plurality of lanes;
a plurality of transmitters configured to transport data at a first data rate on one or more lanes of the plurality of lanes to a plurality of receivers; and
control logic;
wherein responsive to determining to change a target bandwidth for transmitting data on the plurality of lanes, the control logic is configured to:
use a positive non-zero threshold percentage to determine how many lanes should stop transporting data to be reconfigured to a second data rate; and
reconfigure a first number of lanes of the plurality of lanes while maintaining data transport on a second number of lanes of the plurality of lanes, wherein the first number of lanes are chosen so that the second number of lanes transporting data at the first data rate meets the positive non-zero threshold percentage of the target bandwidth during reconfiguration.

16. The system as recited in claim 15, wherein subsequent to reconfiguring the first number of lanes, the control logic is configured to transport data at the second data rate on the first number of lanes while preventing data transport on the second number of lanes.

17. The system as recited in claim 15, wherein subsequent to reconfiguring the first number of lanes, the control logic is configured to reconfigure the second number of lanes to enable the second number of lanes to transmit data at the second data rate.

18. The system as recited in claim 17, wherein the control logic is further configured to prevent data throughput from falling below the positive non-zero threshold percentage of the target bandwidth during reconfiguration of the second number of lanes.

19. The system as recited in claim 18, wherein the control logic is further configured to reduce a number of lanes of the second number of lanes being reconfigured responsive to data throughput falling below the positive non-zero threshold percentage of the target bandwidth during reconfiguration.

20. The system as recited in claim 15, wherein the target bandwidth is specified as an aggregate bandwidth.

* * * * *